Patented June 27, 1939

2,163,946

UNITED STATES PATENT OFFICE 2,163,946

DERIVATIVES OF PHENANTHROLINS AND PROCESS OF PREPARING THE SAME

Hans Henecka, Wuppertal-Elberfeld, Germany, assignor to Winthrop Chemical Company, Inc., New York, N. Y., a corporation of New York No Drawing. Application June 25, 1937, Serial No. 150,331. In Germany July 8, 1936

5 Claims. (Cl. 260—289)

This invention relates to derivatives of phenanthrolins and to a process of preparing the same.

In accordance with the present invention new technically valuable derivatives of phenanthrolins are obtainable by reacting upon a phenanthrolin which contain in at least one of the positions 2- and 4-, 2'- and 4'- respectively, ($\alpha$- and $\gamma$-positions with respect to the nuclear nitrogen atoms) a halogen atom with an alcohol or phenol compound in the presence of an acid binding agent. As the alcohol or phenol compound the alcoholates or phenolates of metals, particularly alkali and alkaline-earth metals may be used. In this manner ether derivatives of phenanthrolins are obtained which have proved to be suitable as starting materials for chemical processes. The said ether compounds themselves are furthermore distinguished by their anodyne action.

The reaction may be performed with the halogen compounds of ortho, meta- and para-phenanthrolins. The reaction of the 2- or 4-halogen phenanthrolins with the alcohol or phenol compounds is carried out in the presence of a solvent or diluent at higher temperatures and, if desired, under pressure. Depending on the reactivity of the initial materials the temperature may be varied. Thus temperatures from about 50 to 250° C. have proved to be suitable to perform the reaction.

The alcohol or phenol the radical of which is to be connected with the phenanthrolin by an ether linkage is advantageously used simultaneously as solvent or diluent.

The reaction is considerably favored by the presence of catalysts, such as copper salts, for instance, copper carbonate. A distinct effect is accomplished even by the slight quantity of copper compounds which are admixed to technical chemicals which are used as the acid binding media, for instance, to technical potassium carbonate. The alcohols of the aliphatic and cycloaliphatic series, particularly also aryl alcohols may be used as the alcohol compounds, for instance, methyl, ethyl, isopropyl and allyl alcohol, cyclopentanol and cyclohexanol, benzylalcohol and phenylethyl alcohol. Apart from the phenols themselves also other compounds of aromatic character containing phenolic hydroxyl groups may be used, for instance compounds of the naphthalene series and of the heterocyclic series containing a nuclearly bound hydroxyl group. Such phenol compounds are the phenols themselves, cresols, halogenated phenols, nitrophenols, amino-, alkylamino phenols and their N-acyl derivatives, phenol carboxylic acids and their esters, naphthols, hydroxydiphenyleneoxide, hydroxyquinoline etc. Alkali and alkaline-earth metal oxides, hydroxides and carbonates are preferably used as the acid binding agents.

The same compounds may also be prepared by reacting upon phenanthrolins which contain in at least one of the positions 2- and 4-, 2'- and 4'- respectively, a hydroxyl group, or upon the metal compounds, preferably the alkali metal compounds of the hydroxy phenanthrolins with reactive esters of alcohols or phenols of the kind specified in the presence of acid binding agents.

Reactive esters which are suitable for the said reaction are, for instance, alkylhalides, preferably alkyliodides, such as methyl, ethyl and isopropyl iodide, furthermore, allyl, crotyl and benzyl halides and dialkyl sulfates. Reactive compounds of the aromatic series are those halogen compounds in which the halogen atoms are activated by other groups, for instance, nitro groups.

The invention is further illustrated by the following examples without being restricted thereto:

*Example 1.*—10.0 grams of 2.2'-dimethyl-4.4'-dichloro-para-phenanthrolin are covered with a solution of 8 grams of potassium hydroxide in 80 ccs. of methyl alcohol. The mixture is heated in the autoclave for 6 hours to 160–170° C. After cooling the dark solution obtained is separated from precipitated potassium chloride and evaporated under reduced pressure. On treating the residue with water thin crystals separate which are filtered off and washed with water. After recrystallization from a mixture of benzene and ligroin the 2.2'-dimethyl-4.4'-bismethoxy-para-phenanthrolin obtained in this manner forms thin, white crystals melting at 213–214° C.

*Example 2.*—1.7 grams of sodium are dissolved in 100 ccs. of cyclohexanol while heating to 120–130° C. After the addition of 10 grams of 2.2'-dimethyl-4.4'-dichloro-para-phenanthrolin the solution is heated to 160–170° C. for 6 hours. From the turbid solution thus obtained first the cyclohexanol is removed by distillation with steam. The semi-solid mass separating is dissolved in about 10% hydrochloric acid and after clearing of the warm solution with animal charcoal precipitated with potassium carbonate as an oil which is taken up in chloroform. After drying of the chloroform solution with solid potassium carbonate the chloroform is evaporated and the remaining oil dissolved in benzene. From this benzene solution dark resinous contaminations are precipitated while adding ligroin, which are separated by filtering. After evaporation of the solvent a residue is obtained which on treatment with ether forms a pure white, crystalline mass. The 2.2'-dimethyl-4.4'-biscyclohexyloxy-para-phenanthrolin obtained in this manner melts at 141° C.

*Example 3.*—10 grams of 2.2'-dimethyl-4.4'-dichloropara-phenanthrolin are mixed with 50 grams of phenol and 10 grams of anhydrous technical potassium carbonate containing traces of a copper salt. The mixture is heated for 6 to 8 hours to 140–150° C. After distilling off the excess phenol with steam the reaction product separates from the hot aqueous solution as an oil which readily solidifies to crystals on cooling. After filtering with suction and recrystallization from alcohol the 2.2'-dimethyl-4.4'-bisphenoxy-para-phenanthrolin is obtained in form of colorless thin crystals which melt at 182–183° C.

In a corresponding manner the following compounds are obtained:

2.2' - dimethyl-4.4' - bis-(4'' - methylphenoxy) para-phenanthrolin, melting at 122° C.;

2.2'-dimethyl-4.4'-bis-(3'',5'' - dimethylphenoxy)-para-phenanthrolin, melting at 123–124° C.;

2.2'-dimethyl-4.4'-bis-(3'' - methylphenoxy)-para-phenanthrolin, melting at 140° C.;

2.2' - dimethyl-4.4'-bis-(4''-chlorophenoxy)-para-phenanthrolin, melting at 205° C.;

4.4'-bis-phenoxy-para-phenanthrolin, melting at 190° C.

*Example 4.*—10 grams of 2.2'-dimethyl-4.4'-dichloro-para-phenanthrolin are heated with 20 grams of hydroquinone-mono-methylether and 7.5 grams of technical potassium carbonate for 8 hours to 150° C. After cooling the melt is taken up in dilute caustic soda solution. The precipitate separating is filtered with suction, washed and recrystallized first from methyl alcohol and then from a mixture of ligroin and benzene. The 2.2'-dimethyl-4.4'-bis-(4''-methoxyphenoxy)-para-phenanthrolin is obtained in the form of white, thin crystals melting at 181° C.

In a corresponding manner the following compounds are obtained:

2.2' - dimethyl - 4.4'bis - (4''- ethoxyphenoxy)-para-phenanthrolin, melting at 167° C.;

2.2'-dimethyl-4.4' - bis-(2''-methoxyphenoxy)-para-phenanthrolin, melting at 265° C.

For obtaining the latter compound 10 grams of 2.2'-dimethyl-4.4' - dichloro-para-phenanthrolin are heated with 60 grams of guaiacol and 15 grams of potassium carbonate for 8 hours to 170° C. After dissolving out the excess of guaiacol with dilute caustic soda solution the new compound is obtained from chloroform-alcohol as a thin, white crystal powder.

*Example 5.*—20 grams of 2.2'-dimethyl-4.4'-dichloro-para-phenanthrolin are heated with 150 grams of hydroquinone and 10 grams of technical potassium carbonate for 6 hours to 200° C. while passing over dry carbon dioxide. After cooling the excess of hydroquinone is removed with hot water. The remaining dark colored residue is dissolved in caustic soda solution for purification, filtered from undissolved parts and precipitated from the alkaline solution as gray-black powder while introducing carbon dioxide. The said precipitate is then dissolved in warm 1 normal hydrochloric acid, the dark solution cleared with animal charcoal, filtered and precipitated with potassium carbonate solution. After filtering with suction and washing and boiling of the precipitate with alcohol, the 2.2'-dimethyl-4.4'-bis-(4'' - hydroxyphenoxy)-para-phenanthrolin is obtained as a light-gray, crystalline powder which is not yet melted at 280° C.

*Example 6.*—10 grams of 2.2'-dimethyl-4.4'-dichloro-para-phenanthrolin are heated with 50 grams of para-nitrophenol and 10 grams of technical potassium carbonate for 6 hours to 140–150° C. After cooling, the excess of para-nitrophenol is dissolved with hot dilute caustic soda solution, the remaining precipitate is filtered with suction and thoroughly washed with hot water. The 2.2'-dimethyl-4.4'-bis-(4''-nitrophenoxy) - para-phenanthrolin is a light yellow, crystalline powder which melts at 273–275° C.

When using m-nitrophenol the 2.2'-dimethyl-4.4'-bis-(3''-nitrophenoxy)-para- phenanthrolin is obtained in a corresponding manner as a weak yellow powder which melts at 240° C.

*Example 7.*—10 grams of 2.2'-dimethyl-4.4'-dichloro-para-phenanthrolin are heated with 50 grams of para-acetaminophenol and 10 grams of technical potassium carbonate for 6 hours to 180° C. The residue obtained from the cold melt after the excess para-acetaminophenol has been dissolved is the 2.2'-dimethyl-4.4'-bis-(4''-acetamino-phenoxy)-para-phenanthrolin w h i c h melts at 202° C. after recrystallization from alcohol.

By saponification from dilute mineral acid the corresponding amino compound is obtained therefrom.

In an analogous manner the following compounds are obtained:

2.2' - dimethyl-4.4'-bis -(3''-acetaminophenoxy)-para-phenanthrolin melting at 153° C.;

2.2'-dimethyl-4.4'-bis-(4''- methoxyacetylamino-phenoxy)-para-phenanthrolin melting at 171° C.;

2.2' - dimethyl - 4.4' - bis - (3''-methoxyacetylaminophenoxy)-para-phenanthrolin melting at 72° C. (in crystal water).

*Example 8.*—10 grams of 2.2'-dimethyl-4.4'-dichloro-para-phenanthrolin are heated with 60 grams of para-hydroxy-benzoic acid ethyl ester and 10 grams of technical potassium carbonate for 8 hours to 170–180° C. The cold melt is first dissolved with methyl alcohol, the solution obtained evaporated and the residue brought into a finely distributed form by pouring into water. By the addition of caustic soda solution the excess para-hydroxy-benzoic acid ester is dissolved and separated from the precipitate formed. The 2.2'-dimethyl-4.4'-bis-(4''-carboxethylphenoxy)-para-phenanthrolin thus obtained forms white, glittery crystals after recrystallization from methyl alcohol which melt at 133° C.

By saponification of this ester with alcoholic potassium or sodium hydroxide the corresponding readily water-soluble potassium- or sodium salt of the basic carboxylic acid can be obtained.

*Example 9.*—10 grams of 2.2'-dimethyl-4.4'-dichloro-para-phenanthrolin are heated with 50 grams of para-hydroxy-acetophenon and 10 grams of technical potassium carbonate for 6 hours to 140–150° C. After dissolving the excess para-hydroxyacetophenon with hot dilute caustic soda solution, the 2.2'-dimethyl-4.4'-bis-(4''-acetophenoxy)-para-phenanthrolin is obtained as a yellow powder which forms colorless, glittery crystals melting at 196° C. after recrystallization from alcohol.

*Example 10.*—10 grams of 2.2'-dimethyl-4.4'-dichloro-para-phenanthrolin are heated with 60 grams of 3-hydroxy-diphenyleneoxide and 7.5 grams of technical potassium carbonate for 8 hours to 160° C. After cooling the excess 3-hydroxydiphenyleneoxide is dissolved with hot dilute caustic soda solution and the precipitate obtained filtered with suction and washed. The 2.2′-dimethyl-4.4′-bis-(diphenylene-oxide-3″-hydroxy)-para-phenanthrolin obtained forms after recrystallization from chloroform-alcohol a white, thin crystal powder which melts at 236° C.

In an analogous manner when using 2-naphthol the 2.2′-dimethyl-4.4′-bis-(2″-naphthoxy)-para-phenanthrolin is obtained from alcohol as a colorless, crystalline powder which melts at 202° C.

*Example 11.*—3.5 grams of metallic potassium are dissolved in 100 ccs. of benzyl alcohol while cold. Then 10 grams of 2.2′-dimethyl-4.4′-dichloro-para-phenanthrolin are added. The mixture is heated to 140–150° C. for 4 hours. After cooling the excess benzyl alcohol is removed by introducing steam. The oil separating from the aqueous solution obtained is dissolved in chloroform, the chloroform solution dried with potassium carbonate and the solvent evaporated. On dissolving the oily residue in ether the 2.2′-dimethyl-4.4′-bis-benzyloxy-para-phenanthrolin is obtained as a thin, white powder which melts after recrystallization from acetone at 143° C.

*Example 12.*—14 grams of 2.2′-dichloro-para-phenanthrolin are heated with 70 grams of phenol and 14 grams of technical potassium carbonate for 6 hours to 140 to 150° C. After distilling off of the excess of phenol with steam the 2.2′-bisphenoxy-para-phenanthrolin separates in glittery leaflets which after recrystallization from a mixture of alcohol and chloroform melt at 188° C.

The 2.2′-dichloro-para-phenanthrolin used as starting material is readily obtained by chlorination of the N.N-dimethyl-2.2′-para-phenanthrolindion with phosphorus pentachloride (compare Kaufmann, Radosevic, "Berichte der Deutschen Chemischen Gesellschaft" 42 (1909), page 2621).

*Example 13.*—5.5 grams of 2-methyl-4-chloro-ortho-phenanthrolin are heated with 20 grams of phenol and 5 grams of technical potassium carbonate for 6 hours to 140–150° C. After distilling off of the excess of phenol with steam the 2-methyl-4-phenoxy-ortho-phenanthrolin separates in crystals. After redissolving from dilute methyl alcohol and subsequently from a mixture of benzene and ligroin small, coarse crystals are obtained which melt at 126–127° C.

The 2-methyl-4-chloro-ortho-phenanthrolin (melting at 136–137° C.) is obtained by chlorination of the 2-methyl-4-hydroxy-ortho-phenanthrolin (melting at 210–211° C.) which is even accessible from 8-amino-quinoline according to the Conrad-Limpach synthesis.

On treatment with the equimolecular quantity of aceto acetic acid ester in chloroform- or carbon tetrachloride- solution at 60–70° C. the 8-amino-quinoline is transformed into the β-(quinolyl-8-amino)-crotonic acid ester which precipitates as an oil. When introducing this ester into paraffin oil which has been heated to 270° C. the 2-methyl-4-hydroxy-ortho-phenanthrolin is obtained from the first precipitated paste after redissolving from chloroform in the form of a fine crystal powder which melts at 210–211° C. By several hours' boiling with phosphorus oxychloride the 2-methyl-4-chloro-ortho-phenanthrolin melting at 136–137° C. is obtained therefrom in the form of fine crystals after redissolving from ligroin.

In an analogous manner the 2-methyl-4-phenoxy-para-phenanthrolin melting at 255° C. is obtained from 2-methyl-4-chloro-para-phenanthrolin (obtainable according to the above described method from 6-amino-quinoline, melting point 183° C.)

*Example 14.*—7 grams of 2-chloro-meta-phenanthrolin are heated with 30 grams of phenol and 6 grams of technical potassium carbonate for 6 hours to 140–150° C. After distilling off of the excess of phenol with steam the 2-phenoxy-meta-phenanthrolin separates as a light powder; from methyl alcohol white glittery needles are obtained which melt at 121° C.

The 2-chloro-meta-phenanthrolin melting at 151° C. is obtained by chlorination of the N-methyl-α-m-phenanthrolin melting at 195° C. with phosphorus pentachloride. The N-methyl-α-m-phenanthrolin itself is obtained according to the methods described by Decker in "Berichte der Deutschen Chem. Ges." 42 (1909), page 1741, from N-methyl-m-phenanthrolinium-methosulfate melting at 171° C. which is readily obtained by rearrangement of dimethylsulfate to the met-aphenanthrolin.

*Example 15.*—60 grams of dimethylsulfate are slowly introduced drop by drop into a solution of 50 grams of 2.2′-dimethyl-4.4′-dihydroxy-p-phenanthrolin (compare copending application Serial No. 150,333) in 250 ccs. of 10% caustic potash lye while heating to 60–70° C. After heating for 2 hours at this temperature an abundant quantity of a light yellow precipitate has formed which is filtered with suction and heated with 1 normal caustic soda solution for a short time. The fine-grained precipitate formed is filtered with suction and washed neutral with water. By recrystallization from a mixture of chloroform and methyl alcohol light yellow crystals melting at 246–247° C. are obtained. According to analysis they form the 2.2′-dimethyl-4-hydroxy-4′-methoxy-para-phenanthrolin.

*Example 16.*—90 grams of benzyl chloride are gradually added drop by drop to a solution of 50 grams of 2.2′-dimethyl-4.4′-dihydroxy-para-phenanthrolin in 375 ccs. of 10% caustic potash solution while heating to 100–110° C. After heating for 2 hours to 100–110° C. a semi-solid paste is separated which is transformed into a white powder after treatment with chloroform. After recrystallization from a mixture of chloroform and methyl-alcohol a white crystal powder is obtained which does not yet melt at 280° C. which, according to anaylsis, is the 2.2′-dimethyl-4-hydroxy-4′-benzyloxy-para-phenanthrolin.

*Example 17.*—25 grams of 2.2′-dimethyl-4.4′-dihydroxy-para-phenanthrolin are dissolved in 185 ccs. of 10% caustic potash solution. 43 grams of allyl bromide are gradually added drop by drop to the solution which is heated to 90–100° C. The reaction mixture is kept at this temperature for further 2 hours. On cooling a semi-solid precipitate separates which on boiling with methyl alcohol forms yellowish, thin needles which do not melt on heating to 290° C. The new product has the composition of a 2.2′-dimethyl-4-hydroxy-4′-allyloxy-para-phenanthrolin.

*Example 18.*—29 grams of the dipotassium salt of 2.2′-dimethyl-4.4′-dihydroxy-para-phenanthrolin are heated with 60 grams of ortho-nitrochlorobenzene, 0.5 gram of copper powder and 0.5 grams of sodium iodine for six hours to 140–150° C. After distilling off of the excess of nitrochlorobenzene a turbid solution is obtained from which a fine yellow-brown powder separates which after separation is dissolved in glacial acetic acid. The solution obtained is filtered from small quantities of copper, diluted with water and precipitated with ammonia. After recrystallization from alcohol of the precipitate thus obtained the 2.2'-dimethyl-4-hydroxy-4'-ortho-nitro-phenoxy-para-phenanthrolin is obtained as a gray-brown, fine crystalline powder which does not yet melt at 280° C.

Example 19.—10 grams of 2.2'-dimethyl-4.4'-dichloro-para-phenanthrolin are heated with 60 grams of 6-hydroxy-quinoline, 10 grams of potassium carbonate and 0.1 gram of copper carbonate for 6 hours to 220° C. From the dark melt obtained the excess hydroxyquinoline is dissolved with warm dilute caustic soda solution after cooling, the undissolved residue is filtered with suction, washed and recrystallized from alcohol. The 2.2'-dimethyl-4.4'-bis-(quinolyl-6''-hydroxy)-para-phenanthrolin is a fine crystal powder which melts at 221° C.

Example 20.—10 grams of 2.2'-dimethyl-4.4'-dichloro-para-phenanthrolin, 50 grams of phenol, 10 grams of calcium carbonate and 0.1 g. of copper carbonate are heated for 6 hours to 140–150° C. During heating the calcium carbonate dissolves with the evolution of carbonic acid and the formation of calcium phenolate, which reacts with the dichlorophenanthrolin. After distilling off of the phenol with steam an oily suspension is obtained from which after the addition of 5 ccs. of concentrated caustic soda solution a crystalline mass separates. After filtering off and washing the precipitate obtained is boiled with alcohol. From the alcoholic solution the 2.2'-dimethyl-4.4'-bis-phenoxy-para-phenanthrolin described in Example 3 is obtained on concentration.

Example 21.—25 grams of 2.2'-dimethyl-4.4'-dihydroxy-para-phenanthrolin are dissolved in 125 ccs. of 10% caustic potash solution while heating to 60° C. Then 54 grams of methyl iodide are gradually added drop by drop and the mixture is heated for 10–15 hours to 60–70° C. until the gradually forming light yellow precipitate is not further increased. After filtering off and washing with dilute caustic soda solution and water the 2.2'-dimethyl-4-hydroxy-4'-methoxy-para-phenanthrolin already described in Example 15 is obtained as a light yellow crystal powder.

Example 22.—3.5 grams of N-methyl-1,2,3,4-tetrahydro-2'-methyl-4'-chloro-para-phenanthrolin are mixed with 20 grams of phenol and 3.6 grams of potassium carbonate after adding a trace of copper carbonate for 6 hours at 130–140° C. After distilling off of the phenol with steam a dark resin is obtained which is first recrystallized from ether: petroleum ether and then recrystallized from ligroin. The N-methyl-1,2,3,4-tetrahydro-2'-methyl-4'-phenoxy-para-phenanthrolin is a light yellow colored crystal powder which melts at 86° C.

The N-methyl-1,2,3,4-tetrahydro-2'-methyl-4'-chloro-para-phenanthrolin melting at 89° C. used as starting material is obtained by the action of phosphorus oxychloride upon N-methyl-1,2,3,4-tetrahydro-2'-methyl-4'-hydroxy-para-phenanthrolin melting at 248° C., which is accessible, for instance when using the Conrad-Limpach synthesis to N-methyl-1,2,3,4-tetrahydro-6-aminoquinoline.

I claim:

1. Phenanthrolin ether derivatives in which at most two of the positions 2, 2', 4 and 4' (alpha- and gamma-positions with regard to the nuclear nitrogen atoms) are connected with an oxygen atom of a radical selected from the group consisting of alcohol and phenol radicals, two such substituents being connected with different pyridine rings of the phenanthrolin.

2. Para-phenanthrolin ether derivatives in which at most two of the positions 2, 2' 4 and 4' (alpha- and gamma-positions with regard to the nuclear nitrogen atoms) are connected with an oxygen atom of a radical selected from the group consisting of alcohol and phenol radicals, two such substituents being connected with different pyridine rings of the phenanthrolin.

3. Para-phenanthrolin ether derivatives in which the 4- and 4'-positions are connected with an oxygen atom of a phenol radical.

4. 4.4'-bis-phenoxy-para-phenanthrolins.

5. 2.2'-dimethyl-4.4'-bis-phenoxy-para-phenanthrolin.

HANS HENECKA.